United States Patent
Ives et al.

(10) Patent No.: US 12,438,981 B2
(45) Date of Patent: Oct. 7, 2025

(54) PHONE NUMBER LIST MANAGEMENT

(71) Applicant: T-Mobile USA, Inc., Bellevue, WA (US)

(72) Inventors: Derrick Ives, North Bend, WA (US); Ovidiu Serban, Sammamish, WA (US); Adriana Padilla, Shoreline, WA (US); Samantha Klemm, Seattle, WA (US); Vanda Oliveira, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/658,538

(22) Filed: May 8, 2024

(65) Prior Publication Data
US 2024/0297933 A1    Sep. 5, 2024

Related U.S. Application Data

(63) Continuation of application No. 17/497,625, filed on Oct. 8, 2021, now Pat. No. 12,010,263.

(51) Int. Cl.
*H04M 3/42* (2006.01)

(52) U.S. Cl.
CPC ... *H04M 3/42059* (2013.01); *H04M 3/42085* (2013.01); *H04M 2203/2055* (2013.01); *H04M 2203/6045* (2013.01)

(58) Field of Classification Search
CPC .............. H04M 3/42059; H04M 3/42085
USPC ........................................................ 455/415
See application file for complete search history.

(56) References Cited

U.S. PATENT DOCUMENTS

| | | | |
|---|---|---|---|
| 6,990,187 B2 | 1/2006 | MacNamara et al. | |
| 7,307,997 B2 | 12/2007 | Vinokurov et al. | |
| 7,409,203 B2 | 8/2008 | Zabawskyj et al. | |
| 7,418,253 B2 | 8/2008 | Kavanagh | |
| 8,042,161 B1 * | 10/2011 | Cooley | H04L 51/48 713/168 |
| 12,010,263 B2 | 6/2024 | Ives et al. | |
| 2006/0135132 A1 | 6/2006 | Cai et al. | |
| 2007/0143422 A1 | 6/2007 | Cai | |

(Continued)

OTHER PUBLICATIONS

U.S. Appl. No. 17/497,625, Office Action mailed Sep. 29, 2023, 29 pages.

(Continued)

*Primary Examiner* — Ahmad F. Matar
*Assistant Examiner* — Jirapon Tulop

(57) ABSTRACT

Methods, systems, and apparatus, including computer programs encoded on a computer storage medium, for managing a phone number list are disclosed. In one aspect, a method includes the actions of receiving, by a computing device, telephone call data that reflects characteristics of telephone calls placed and received by a first user. Based on the telephone call data, the actions further include generating, by the computing device, a first telephone number whitelist for the first user. The actions further include determining, by the computing device, whether to combine the first telephone number whitelist and a second telephone number whitelist for a second user. The actions further include storing, by the computing device, the first telephone number whitelist or the combined telephone number whitelist in association with the first user.

19 Claims, 3 Drawing Sheets

(56) References Cited

U.S. PATENT DOCUMENTS

| | | | |
|---|---|---|---|
| 2008/0084975 A1* | 4/2008 | Schwartz | H04M 3/436 |
| | | | 379/88.22 |
| 2009/0103701 A1 | 4/2009 | Garg et al. | |
| 2014/0199975 A1* | 7/2014 | Lou | H04W 4/16 |
| | | | 455/414.1 |
| 2022/0327203 A1* | 10/2022 | Sasaki | G06F 21/12 |

OTHER PUBLICATIONS

U.S. Appl. No. 17/497,625, Notice of Allowance mailed Feb. 20, 2024, 7 pages.

* cited by examiner

PHONE NUMBER LIST MANAGEMENT

CROSS-REFERENCE TO RELATED APPLICATION

This application is a continuation of and claims priority under 35 U.S.C. § 120 to U.S. patent application Ser. No. 17/497,625 filed on Oct. 8, 2021, entitled "Phone Number List Management" by Derrick Ives, et al., which is incorporated herein by reference in its entirety for all purposes.

BACKGROUND

A phone number blacklist may include a list of phone numbers from which telephone calls should be blocked. A phone number whitelist may include a list of phone numbers from which telephone calls should be permitted.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Reducing the number of spam telephone calls that a customer receives is an important factor in improving customer satisfaction. Some techniques for reducing spam calls can involve collecting and analyzing data from various sources. Accessing and analyzing these data sources can be time consuming when considering that the network provider should determine whether a call is spam in the time between the calling party placing the call and the called party's phone ringing. It would be beneficial to be able to compare the phone number of the calling party to a blacklist and/or whitelist to quickly determine whether to block the phone call. Using this technique relies on the accuracy of the of the blacklist and/or whitelist, which may be different for each called party.

To generate an accurate blacklist and/or whitelist, a service provider can analyze various factors for each phone number of a called party. Those factors can include the location of a phone of the called party when placing phone calls, the duration of answered phone calls between two parties, the frequency of phone calls between two parties, whether the called party answers the phone call, the length of time that the phone number has been assigned to the calling party, the time period that the phone number was inactive before being assigned to the calling party, and/or any other similar factors. In some instances, whitelists and/or blacklists for various called parties can be combined depending on a level of trust between two parties. The level of trust can be based on the frequency and duration of calls between two parties and data provided by the parties themselves.

Figure 1:
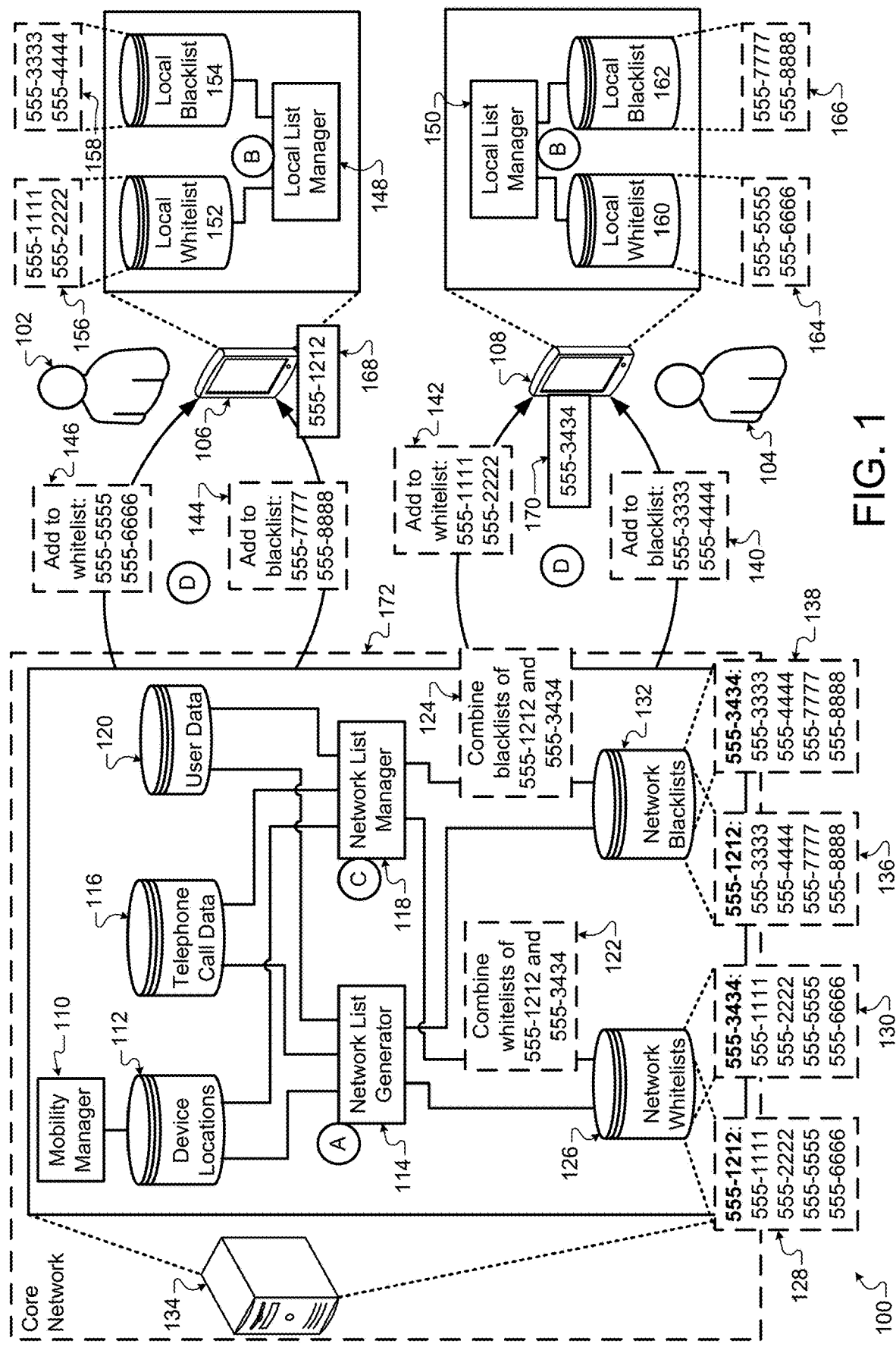
FIG. 1 illustrates an example system that is configured to generate and manage telephone number whitelists and blacklists.

FIG. 1 illustrates an example system 100 that is configured to generate and manage telephone number whitelists and blacklists. Briefly, and as described in more detail below, the system 100 includes a server 134 that is configured to analyze telephone call data 116 and generate network whitelists 126 and network blacklists 132. The server 134 may use these network whitelists 126 and network blacklists 132 to determine whether to connect telephone calls. The server 134 may also manage these network whitelists 126 and network blacklists 132 by synchronizing them with local whitelists and blacklists on devices and by merging them with other whitelists and blacklists. FIG. 1 includes various stages A through D that may illustrate the performance of actions and/or the movement of data between various components of the server 134 and/or between the server 134 and other computing devices. The system 100 may perform these stages in any order.

In more detail, the user 102 may use the computing device 106 to place and receive telephone calls, and the user 104 may use the computing device 108 to place and receive telephone calls. Some of these telephone calls may be unwanted, or spam, calls. Unwanted calls may include nuisance telephone calls, robo telephone calls, prank telephone calls, telemarketing telephone calls, and/or any other type of telephone call that a called party does not want to ring the called party's phone. The server 134 may store telephone numbers of unwanted calls in the network blacklists 132. Other calls may be wanted calls. In other words, these telephone calls are the type that should be ring the called party's phone. For these type of telephone calls, the telephone service provide should connect the telephone calls with little or no analyzing to determine whether the telephone call should be connected. These telephone calls may be those from friends, family, and/or any other similar calling parties. The server 134 may store telephone numbers of wanted calls in the network whitelists 126. In some instances, a telephone number of a calling party may not be included in the network whitelists 126 or the network blacklists 132. In this case, the server 134 may perform additional processing on the telephone call to determine whether to ring the called party's phone.

The server 134 may be included in or in communication with a network such as a wireless carrier network that provides voice and data communication services to multiple devices, such as the computing devices 106 and 108 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 134 may communicate with the computing devices 106 and 108 and other devices using a Wi-Fi network, short range radio, infrared communication, and/or any other similar communication technique.

The wireless carrier network may include a radio access network and a core network 172. The radio access network may include multiple base stations. The multiple base stations are responsible for handling voice and/or data traffic between multiple devices, such as the computing devices 106 and 108 and other devices and the core network 172. Accordingly, each of the base stations may provide a corresponding network cell that delivers telecommunication and data communication coverage. The core network 172 may use the network cells to provide communication services to the multiple subscriber devices. For example, the core network 172 may connect the multiple devices to other telecommunication and data communication networks, such as the Internet and the public switched telephone network (PSTN). The base stations are responsible handling voice and data traffic between devices and the core network 172. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The server 134 may include a network list generator 114 that may be configured to generate the network whitelists 126 and the network blacklists 132. The network list generator 114 may analyze data related to previous telephone calls and activity of the users 102 and 104 to generate a corresponding whitelist and blacklist for the user 102 and a corresponding whitelist and blacklist for the user 104. The telephone call data 116 and the device locations 112 may include data related to previous telephone calls. The user data 120 may include data related to the activities of the users 102 and 104 on the computing devices 106 and 108 and other computing devices. The network list generator 114 may also use the device locations 112 that indicates the locations of the computing devices 106 and 108 at various times.

The telephone call data 116 may include data related to the incoming and outgoing telephone calls of the computing devices 106 and 108 and other computing devices. The telephone call data 116 may include data indicating the date, time, and/or the duration of the telephone call. The telephone call data 116 may also include data indicating whether the called party answered the telephone call, whether the voicemail system answered the telephone call, and/or whether the calling party left a voicemail. The telephone call data 116 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The users 102 and 104 may use the computing devices 106 and 108 for more than placing and receiving telephone calls. The computing devices 106 and 108 may be any type of device that is configured to communicate with other computing devices through a wired or wireless connection. The computing devices 106 and 108 may utilize a voice communication channel for telephone calls and a data communication channel for other communications. As an example, the computing devices 106 and/or 108 may be mobile phones. The users 102 and 104 may use the computing devices 106 and 108 to access the internet through various mobile phone applications that utilize the data communication channel. The computing devices 106 and/or 108 may also be tablets, laptop computers, desktop computers, wearable devices, and/or any other similar device. In some implementations, the computing devices 106 and 108 may use the data communication channel for telephone calls, such as voice over internet protocol calls.

The user data 120 may include data related to the incoming and outgoing data of the computing devices 106 and 108 and other computing devices. The user data 120 may be related to the incoming and outgoing data of the data communication channel. The user data 120 may include a date, time, duration of the data exchanged, and/or the amount of data exchanged. The user data 120 may also include data indicating a geographic and network location of the computing device with which the computing devices 106 or 108 was communicating. The user data 120 may include data identifying an application on the computing devices 106 or 108 that interacted with the data exchanged. In some implementations, the user data 120 may also include configurations that the user 102 and/or 104 has set or preset configurations on the computing devices 106 and/or 108. These configurations may include whether the computing devices 106 and/or 108 are set to block calls during certain times of the day, block calls during calendar appointments, and/or any other similar phone call related configurations.

The server 134 may include a mobility manager 110. The mobility manager 110 may be configured to monitor the location of the computing devices 106 and 108 that are connected to the server 134 through a wireless base station. The location of the computing devices 106 and 108 may include the location of the wireless base station to which the computing devices 106 and 108 are connected and/or GPS data received from the computing devices 106 and 108. The mobility manager 110 may store the location data in the device locations 112 of the server 134.

In some implementations, the mobility manager 110 may determine the location of a computing devices 106 and 108 at periodic intervals, such as every five seconds. In some implementations, the mobility manager 110 may determine the location of a computing devices 106 and 108 when the computing devices 106 and 108 connect to a different wireless base station and/or provide updated GPS data. In some implementations, the mobility manager 110 may determine the location of the computing devices 106 and 108 relative to the base station with which the computing device is communicating. In this case, the mobility manager 110 may determine the relative location based on data collected from the base station such as signal strength and direction of communications between the computing devices 106 and 108 and the base station. The mobility manager 110 may also determine the relative location based on the location of the base station and GPS data received from the computing devices 106 and 108. The relative location data may include a distance between the computing devices 106 and 108 and the base station, the cardinal direction from the base station to the computing devices 106 and 108, and/or any other similar measurements.

The network list generator 114 may be configured to use various models and/or rules to generate the network whitelists 126 and network blacklists 132. The rules may specify how to compare the telephone call data 116, the user data 120, and/or the device locations 112. Based on the comparison, the rules may specify telephone numbers to add to the network whitelists 126 and/or the network blacklists 132 for the telephone number 168 of the user 102 and/or the telephone number 170 of the user 104. The comparisons may specify patterns to identify in the telephone call data 116, the user data 120, and/or the device locations 112. The server 134 may generate the rules based on analyzing historical telephone call data, user data, and/or device locations. In some instances, the rules may be predetermined based on preferences of the user 102, the user 104, and/or an owner/operator of wireless carrier network of the server 134.

The models may be configured to receive the telephone call data 116, the user data 120, and/or the device locations 112 and output one or more phone numbers to add to the network whitelists 126 and/or the network blacklists 132 for the telephone number 168 of the user 102 and/or the telephone number 170 of the user 104. The models may be trained using machine learning and historical telephone call data, user data, and/or device locations.

In the example of FIG. 1 and stage A, the network list generator 114 may analyze the telephone call data 116, the user data 120, and/or the device locations 112. The network list generator 114 may use the rules and/or models to determine that the network whitelist for the phone number 168 of the user 102 should include 555-1111 and 555-2222. The network list generator 114 may use the rules and/or models to determine that the network blacklist for the phone number 168 of the user 102 should include 555-3333 and 555-4444. The network list generator 114 may use the rules and/or models to determine that the network whitelist 128 for the phone number 170 of the user 140 should include 555-5555 and 555-6666. The network list generator 114 may use the rules and/or models to determine that the network blacklist 136 for the phone number 170 of the user 104 should include 555-7777 and 555-8888.

The server 134 may include a network list manager 118. The network list manager 118 may be configured to manage the network whitelists 126 and the network blacklists 132 and interact with the local list manager 148 of the computing device 106 and with the local list manager 150 of the computing device 108. Managing the network whitelists 126 and the network blacklists 132 may include synchronizing the network whitelists 126 and the network blacklists 132 with local whitelists and blacklists on the computing devices 106 and 108. Managing the network whitelists 126 and the network blacklists 132 may also include merging various network whitelists 126 and the network blacklists 132.

The computing devices 106 and 108 may include local whitelists 152 and 160 and local blacklists 154 and 162. The local whitelists 152 and 160 and local blacklists 154 and 162 may be similar to the network whitelists 126 and network blacklists 132. The local blacklists 154 and 162 include phone numbers from which the users 102 and 104 do not want to receive telephone calls. The local whitelists 152 and 160 include phone numbers that the users 102 and 104 want to ensure are not blocked. The local whitelists 152 and 160 and local blacklists 154 and 162 may be phone numbers to which the computing devices 106 and 108 compare the phone number of an incoming telephone call in order to determine whether to permit the telephone call, block the telephone call, or perform additional processing to determine whether to block or permit the telephone call.

The user 102 may manually add phone numbers to the local whitelist 152 and the local blacklist 154. For example, the phone numbers in the address book of the user 102 may be included in the local whitelist 152. In some instances, the user 102 may also add other phone numbers that are not included in the address book of the user 102. The phone numbers may be those that the user 102 may not call, but may want to ensure that the computing device 106 does not block. The user 102 may add phone numbers to the local blacklist 154 after receiving an unwanted telephone call. In some instances, the user 102 may add a phone number to the local blacklist 154 before receiving a telephone call.

The network list manager 118 may communicate with the local list manager 148 to determine the phone numbers included in the local whitelist 152 and the local blacklist 154. The network list manager 118 may compare the phone numbers in the local whitelist 152 to the phone numbers in the network whitelist 126 for the phone number 168 of the user 102. The network list manager 118 may be configured to synchronize the local whitelist 152 and the network whitelist 126 for the phone number 168. In stage B, the network list manager 118 may identify the phone numbers included in the local whitelist 152 that are not included in the network whitelist 126 for the phone number 168. The network list manager 118 may add those phone numbers to the network whitelist 126 for the phone number 168. The network list manager 118 may identify the phone numbers included in the network whitelist 126 for the phone number 168 that are not included in the local whitelist 152. The network list manager 118 may add those phone numbers to the local whitelist 152 by providing instructions to the local list manager 148 to add the phone numbers. The network list manager 118 may identify the phone numbers included in the local blacklist 154 that are not included in the network blacklist 132 for the phone number 168. The network list manager 118 may add those phone numbers to the network blacklist 132 for the phone number 168. The network list manager 118 may identify the phone numbers included in the network blacklist 132 for the phone number 168 that are not included in the local blacklist 154. The network list manager 118 may add those phone numbers to the local blacklist 154 by providing instructions to the local list manager 148 to add the phone numbers.

Similarly, the network list manager 118 may identify the phone numbers included in the local whitelist 160 that are not included in the network whitelist 126 for the phone number 170. The network list manager 118 may add those phone numbers to the network whitelist 126 for the phone number 170. The network list manager 118 may identify the phone numbers included in the network whitelist 126 for the phone number 170 that are not included in the local whitelist 160. The network list manager 118 may add those phone numbers to the local whitelist 160 by providing instructions to the local list manager 150 to add the phone numbers. The network list manager 118 may identify the phone numbers included in the local blacklist 162 that are not included in the network blacklist 132 for the phone number 170. The network list manager 118 may add those phone numbers to the network blacklist 132 for the phone number 170. The network list manager 118 may identify the phone numbers included in the network blacklist 132 for the phone number 170 that are not included in the local blacklist 162. The network list manager 118 may add those phone numbers to the local blacklist 162 by providing instructions to the local list manager 150 to add the phone numbers.

The network list manager 118 may initiate a synchronization of the network and local lists in response to various events. These events may include a change in the network whitelists 126 and/or network blacklists 132, a request from the local list managers 148 and/or 150, a merging of whitelists or blacklists included in the network whitelists 126 and/or network blacklists 132 and/or any other similar event. The local list managers 148 and/or 150 may request a synchronization in response to detecting a change in the local whitelists 152 or 160 or the local blacklists 154 or 162, in response to a request from the user 102 or 104, and/or any other similar event. In some implementations, the network list manager 118 may initiate a synchronization periodically, such as once per day.

The network list manager 118 may be configured to merge one or more whitelists or blacklists included in the network whitelists 126 or network blacklists 132. Merging two whitelists or blacklists may include identifying the phone numbers of a first list that are not included in the second list and adding the missing phone numbers to the second list and identifying the phone numbers of the second list that are not included in the first list and adding the missing phone numbers to the first list. The network list manager 118 may use rules and/or models to determine whether to merge one or more whitelists or blacklists. The rules may specify how to compare the telephone call data 116, the user data 120, the device locations 112, the whitelists, and/or the blacklists. For the case of determining whether to merge the network whitelist of the phone number 168 and the network whitelist of the phone number 170, the network list manager 118 may compare the device locations 112 of the computing devices 106 and 108, the telephone call data 116 of the users 102 and 104, the user data of the users 102 and 104, the network whitelist of the phone number 168, the network whitelist of the phone number 170, the network blacklist of the phone number 168, and/or the network blacklist of the phone number 170. Based on the comparison, the network list manager 118 may determine whether to merge the network whitelist of the phone number 168 and the network whitelist of the phone number 170. Similarly, for the case of determining whether to merge the network blacklist of the phone number 168 and the network blacklist of the phone number 170, the network list manager 118 may compare the device locations 112 of the computing devices 106 and 108, the telephone call data 116 of the users 102 and 104, the user data of the users 102 and 104, the network whitelist of the phone number 168, the network whitelist of the phone number 170, the network blacklist of the phone number 168, and/or the network blacklist of the phone number 170. Based on the comparison, the network list manager 118 may determine whether to merge the network blacklist of the phone number 168 and the network blacklist of the phone number 170.

Some of the comparisons specified in the rules may include determining whether at least a threshold number of phone numbers of the two lists match, whether the users 102 and 104 have communicated within a threshold time period, whether the users 102 and 104 are in the same location for at least a threshold period of time during a previous time period, and/or any other similar comparisons. Based on the outcome of these comparisons, the network list manager 118 may determine whether to merge two lists. Additional rules may be predetermined by the users 102 or 104 and/or an operator/owner of the wireless carrier network of the server 134. As an example, these rules may indicate to merge the lists of two users if the users have preidentified the other user as someone with whom to merge lists. In this case, a user may identify the other user as a trusted user.

A model may be configured to receive telephone call data 116, the user data 120, the device locations 112, and/or a first whitelist or blacklist and output a phone number identifying a second whitelist or blacklist to merge with the first whitelist or blacklist. The server 134 may train the model using machine learning and historical data includes previous telephone call data, user data, device locations, merged whitelists or blacklists, and/or data identifying the telephone numbers of the merged whitelists or blacklists. Different models may be configured to receive different types of information. For example, a model may be configured to receive telephone numbers of previous phone calls, dates and times of the previous telephone calls, a duration of the previous telephone calls, and a whitelist. This model may be configured to output a phone number that corresponds with a whitelist to merge with the received whitelist. Another model may be configured to receive telephone numbers of messages, the contents of those messages, dates and time of the previous messages, and a blacklist. This model may be configured to output a phone number that corresponds with a blacklist to merge with the received blacklist. The network list manager 118 may be configured to select the appropriate model based on the data that the network list manager 118 has to provide to the model.

In stage C, the network list manager 118 may determine whether to merge the network whitelist of the phone number 168 of the user 102 with any other additional whitelists. The network whitelist of the phone number 168 may include 555-1111 and 555-2222. The network list manager 118 may determine whether to merge the network whitelist of the phone number 168 with any other whitelists in response to various events. These events may include a change to the network whitelist of the phone number 168, a request from the user 102, a synchronization event between the network whitelist of the phone number 168 and the local whitelist 152, a request from the local list manager 148, and/or any other similar event. In some instances, the network list manager 118 may determine whether to merge the network whitelist of the phone number 168 with any other whitelists on a periodic basis, such as every two days.

The network list manager 118 may access the device locations 112 for the computing device 106, the telephone call data 116 for the user 102, and the user data 120 for the user 102. The network list manager 118 may identify models and/or rules to apply to the device locations 112 for the computing device 106, the telephone call data 116 for the user 102, the user data 120 for the user 102, and the network whitelist of the phone number 168. The rules and/or model may specify to merge the network whitelist of the phone number 168 with the network whitelist of the phone number 170. The network whitelist of the phone number 170 may include the phone numbers 555-5555 and 555-6666. Based on the determination 122 to merge, or combine, the network whitelist of the phone number 170 with the network whitelist of the phone number 168, the network list manager 118 may determine that the phone numbers 555-5555 and 555-6666 are included in the network whitelist of the phone number 170 and not in the network whitelist of the phone number 168. The network list manger 118 may also determine that the phone numbers 555-1111 and 555-2222 are included in the network whitelist of the phone number 168 and not in the network whitelist of the phone number 170.

The network list manager 118 may add the phone numbers 555-1111 and 555-2222 to the network whitelist of the phone number 170 and add the phone numbers 555-5555 and 555-6666 to the network whitelist of the phone number 168. The resulting network whitelists include the network whitelist 128 for the phone number 168 that includes the phone numbers 555-1111, 555-2222, 555-5555, and 555-6666 and the network whitelist 130 for the phone number 170 that includes the phone numbers 555-1111, 555-2222, 555-5555, and 555-6666.

The network list manager 118 may also determine whether to merge the network blacklist of the phone number 168 of the user 102 with any other additional blacklists. The network blacklist of the phone number 168 may include 555-3333 and 555-4444. The network list manager 118 may determine whether to merge the network blacklist of the phone number 168 with any other blacklists in response to various events. These events may include a change to the network blacklist of the phone number 168, a request from the user 102, a synchronization event between the network blacklist of the phone number 168 and the local blacklist 154, a request from the local list manager 148, and/or any other similar event. In some instances, the network list manager 118 may determine whether to merge the network blacklist of the phone number 168 with any other blacklists on a periodic basis, such as every two days.

The network list manager 118 may access the device locations 112 for the computing device 106, the telephone call data 116 for the user 102, and the user data 120 for the user 102. The network list manager 118 may identify models and/or rules to apply to the device locations 112 for the computing device 106, the telephone call data 116 for the user 102, the user data 120 for the user 102, and the network blacklist of the phone number 168. The rules and/or model may specify to merge the network blacklist of the phone number 168 with the network blacklist of the phone number 170. The network blacklist of the phone number 170 may include the phone numbers 555-7777 and 555-8888. Based on the determination 124 to merge the network blacklist of the phone number 170 with the network blacklist of the phone number 168, the network list manager 118 may determine that the phone numbers 555-7777 and 555-8888 are included in the network blacklist of the phone number 170 and not in the network blacklist of the phone number 168. The network list manger 118 may also determine that the phone numbers 555-3333 and 555-4444 are included in the network blacklist of the phone number 168 and not in the network blacklist of the phone number 170.

The network list manager 118 may add the phone numbers 555-3333 and 555-4444 to the network blacklist of the phone number 170 and add the phone numbers 555-7777 and 555-8888 to the network blacklist of the phone number 168. The resulting network blacklists include the network blacklist 136 for the phone number 168 that includes the phone numbers 555-3333, 555-4444, 555-7777, and 555-8888 and the network blacklist 138 for the phone number 170 that includes the phone numbers 555-3333, 555-4444, 555-7777, and 555-8888.

In some implementations, the network list manger 118 may automatically determine to merge the whitelist or blacklist of a phone number in response to determining to merge other of the whitelist or blacklist. For example, the network list manager 118 may determine to merge the whitelist of the phone number 168 with the whitelist of the phone number 170. Based on this determination, the network list manager 118 may determine to merge the blacklist of the phone number 168 with the blacklist of the phone number 170. In some implementations, there may be various rules or user preferences that may specify to bypass merging the whitelist or blacklist of a phone number in response to determining to merge other of the whitelist or blacklist.

In response to merging the network whitelist 128 for the phone number 168 and the network whitelist 130 for the phone number 170 and in stage D, the network list manager 118 may determine to synchronize network whitelist 128 for the phone number 168 and the local whitelist 152 and synchronize the network whitelist 130 for the phone number 170 and the local whitelist 160. Similar to the synchronization process described above, the network list manager 118 may compare the network whitelist 128 with the local whitelist 152. The network list manager 118 may determine that the phone numbers 555-5555 and 555-6666 are included in the network whitelist 128 and not included in the local whitelist 152. The network list manger 118 may generate the instruction 146 to provide to the local list manager 148 of the computing device 106. The instruction 146 may indicate to add the phone numbers 555-5555 and 555-6666 to the local whitelist 152. The network list manager 118 may determine that the phone numbers 555-7777 and 555-8888 are included in the network blacklist 136 and not included in the local blacklist 154. The network list manger 118 may generate the instruction 144 to provide to the local list manager 148 of the computing device 106. The instruction 144 may indicate to add the phone numbers 555-7777 and 555-8888 to the local blacklist 154.

The network list manager 118 may determine that the phone numbers 555-1111 and 555-2222 are included in the network whitelist 130 and not included in the local whitelist 160. The network list manger 118 may generate the instruction 142 to provide to the local list manager 150 of the computing device 108. The instruction 143 may indicate to add the phone numbers 555-1111 and 555-2222 to the local whitelist 160. The network list manager 118 may determine that the phone numbers 555-3333 and 555-4444 are included in the network blacklist 138 and not included in the local blacklist 162. The network list manger 118 may generate the instruction 140 to provide to the local list manager 150 of the computing device 108. The instruction 140 may indicate to add the phone numbers 555-3333 and 555-4444 to the local blacklist 162.

The network list generator 114 may continue to monitor the device locations 112, the telephone call data 116, and the user data 120 to determine whether any additional phone numbers should be added or removed from the whitelists included in the network whitelists 126 and/or from the blacklists included in the network blacklists 132. The network list manager 118 may continue to monitor the network whitelists 126 and the network blacklists 132 to determine whether to synchronize or merge any of the whitelists or blacklists.

Figure 2:
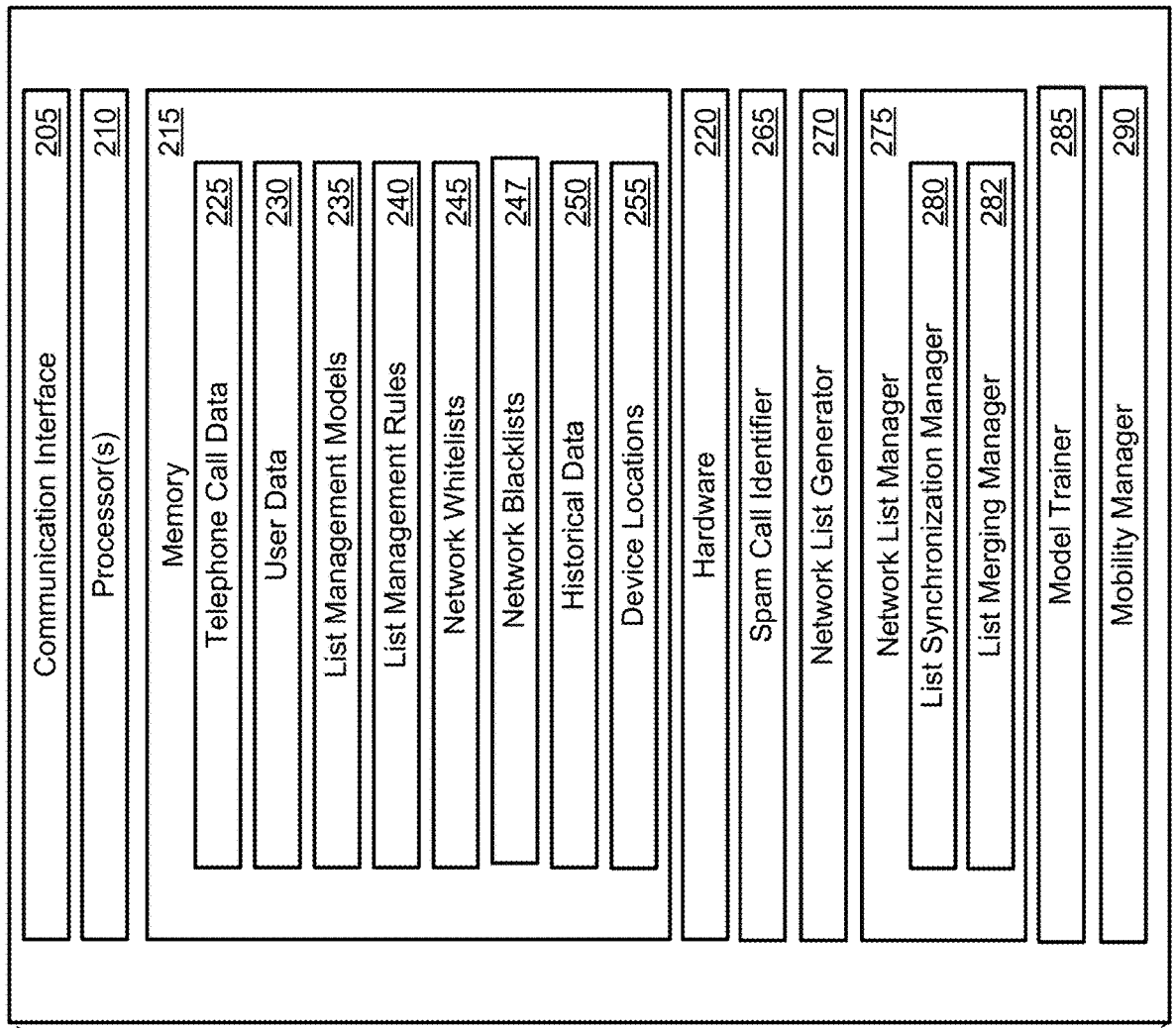
FIG. 2 illustrates an example server that is configured to generate and manage telephone number whitelists and blacklists.

FIG. 2 illustrates an example server 200 that is configured to generate and manage telephone number whitelists and blacklists. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 134 of FIG. 1. Some of the components of the server 200 may be implemented in a single computing device or distributed over multiple computing devices. For example, components of the server 200 may be implemented in the server 134, the computing device 106, and/or the computing device 108. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 215 may be stored externally from the server 200.

The one or more processors 210 may implement, through the execution of computer-executable instructions, a mobility manager 290. The mobility manager 290 may be similar to the mobility manager 110 of FIG. 1. The mobility manager 290 may be configured to monitor the location of a computing device that is connected to the server 200 through a wireless base station. The location of the computing device may include the location of the wireless base station to which the computing device is connected and/or GPS data received from the computing device. The mobility manager 290 may store the location data in the device locations 255 of the server 200.

In some implementations, the mobility manager 290 may determine the location of a computing device at periodic intervals, such as every five seconds. In some implementations, the mobility manager 290 may determine the location of a computing device when the computing device connects to a different wireless base station and/or provides updated GPS data. In some implementations, the mobility manager 290 may determine the location of the computing device relative to the base station with which the computing device is communicating. In this case, the mobility manager 290 may determine the relative location based on data collected from the base station such as signal strength and direction of communications between the computing device and the base station. The mobility manager 290 may also determine the relative location based on the location of the base station and GPS data received from the computing device. The relative location data may include a distance between the computing device and the base station, the cardinal direction from the base station to the subscriber device, and/or any other similar measurements.

The memory 215 may store telephone call data 225 that is related to the incoming and outgoing telephone calls of various computing devices. The telephone call data 225 may be similar to the telephone call data 116 of FIG. 1. The telephone call data 225 may include data indicating the date, time, and/or the duration of a telephone call. The telephone call data 225 may also include data indicating whether the called party answered the telephone call, whether the voicemail system answered the telephone call, and/or whether the calling party left a voicemail. The telephone call data 225 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The memory may store user data 230 that is related to the data communications and related actions of the various computing devices communicating with other computing devices through the server 200. The user data 230 includes data related to the incoming and outgoing data of the computing devices. The user data 230 may be related to the incoming and outgoing data of the data communication channel. The user data 230 may include a date, time, duration of the data exchanged, and/or the amount of data exchanged. The user data 230 may also include data indicating a geographic and network location of the other computing device with which the computing device. The user data 230 may include data identifying an application on the computing device that interacted with the data exchanged. The user data 230 may include data identifying the computing devices involved in the data exchange.

The memory may store network whitelists 245. The network whitelists 245 may be similar to the network whitelists 126 of FIG. 1. The network whitelists 245 may include one or more whitelists for various computing devices that communicate with the server 200. The network whitelists 245 may store a whitelist in association with a phone number, computing device, and/or other data identifying a user or device. The memory may also store network blacklists 247. The network blacklists 247 may be similar to the network blacklists 132 of FIG. 1. The network blacklists 247 may include one or more blacklists for various computing devices that communicate with the server 200. The network blacklists 247 may store a whitelist in association with a phone number, computing device, and/or other data identifying a user or device.

The server 200 may receive a notification of an incoming telephone call from a computing device or from another network. The notification may include the calling phone number of the calling device and the called phone number of the called device. The server 200 may access the whitelist associated with the called phone number from the network whitelists 245 and the blacklist associated with the called phone number from the network blacklists 247. If the calling phone number is included in the whitelist associated with the called phone number, then the server 200 may take the next steps in notifying the called device of the incoming telephone call. If the calling phone number is included in the blacklist associated with the called phone number, then the server 200 may bypass taking the next steps in notifying the called device of the incoming telephone call. The server 200 may connect the incoming telephone call to the voicemail system without notifying the called device of the incoming telephone call. If the calling phone number is not included in either the whitelist or blacklists associated with the called phone number, then the server 200 may perform additional processing on the incoming telephone call to determine whether to take the next steps in notifying the called device of the incoming telephone call.

In some implementations, the additional processing on the incoming telephone call may involve determining whether the incoming telephone call is a spam telephone call. The one or more processors 210 may implement, through the execution of computer-executable instructions, a spam call identifier 265. The spam call identifier 265 may be configured to determine whether an incoming telephone call is a spam telephone call. If the incoming telephone call is a spam telephone call, then the spam call identifier 265 may block the incoming telephone call and add the phone number to each of the blacklists in the network blacklists 247. If the incoming telephone call is not a spam telephone call, then the spam call identifier 265 may take the next steps in notifying the called device of the incoming telephone call.

The one or more processors 210 may implement, through the execution of computer-executable instructions, a network list generator 270. The network list generator 270 may be similar to the network list generator 114 of FIG. 1. The network list generator 270 may be configured to analyze the device locations 255, the telephone call data 225, and the user data 230 to determine whether to add any phone numbers to the network whitelists 245 or network blacklists 247. The network list generator 270 may analyze device locations 255, the telephone call data 225, and the user data 230 that are related to a specific user, phone number, or device. Based on that analysis, the network list generator 270 may add phone numbers to the whitelist for the phone number in the network whitelists 245 or to the blacklist for the phone number in the network blacklists 247.

The network list generator 270 may use the list management models 235 and/or the list management rules 240 to analyze the device locations 255, the telephone call data 225, and the user data 230. The list management rules 240 may specify what features, characteristics, and/or patterns to identify in the device locations 255, the telephone call data 225, and the user data 230. Based on the features, characteristics, and/or patterns, the list management rules 240 may specify phone number to add to the whitelist or blacklist. The list management models 235 may be configured to receive data identifying a user, phone number, or device, the device locations 255, the telephone call data 225, and the user data 230 and output one or more phone numbers to add to a whitelist or blacklist for the phone number. The list management models 235 may be trained using machine learning and the historical data 250.

The one or more processors 210 may implement, through the execution of computer-executable instructions, a model trainer 285. The model trainer may be configured to analyze the historical data 250 to generate the list management models 235 and/or the list management rules 240. The historical data 250 may include data similar to the device locations 255, the telephone call data 225, and/or the user data 230. The historical data 250 may also include previous whitelists and blacklists used during the collection of the previous device locations, the previous telephone call data, and/or the previous user data. For example, the historical data 250 may include previous device locations, the previous telephone call data, and the previous user data for a user and computing device with a particular phone number collected during a previous period of time. The historical data 250 may also include phone numbers that were included in a blacklist and whitelist for the user during that period of time. The user may have specified the phone numbers to include in the blacklist and whitelist. In some instances, the network of the server 200 may have identified a phone number for inclusion in the blacklist or whitelist. In this case, the user may have reviewed and confirmed including that phone number in the blacklist or whitelist.

The model trainer 285 may analyze the historical data 250 to identify patterns in the historical data 250. Based on the patterns, the model trainer 285 may generate a rule that specifies what patterns or characteristics of the device locations 255, the telephone call data 225, and/or the user data 230 should correspond to adding or removing a phone number from the whitelist or blacklist for a phone number. For example, the model trainer 285 may generate a rule that specifies that a calling phone number should be added to the blacklist if the called party ignored phone calls from the calling number and the calling phone number called more than two times per month. The model trainer 285 may generate a rule that specifies that a calling phone number should be added to the whitelist if the called party called the calling phone number and answered phone calls from the calling number.

Some of the rules included in the list management rules 240 may be predetermined, received from a user, and/or received from an operator/owner of the network of the server 200. An example rule may specify to add a phone number to a whitelist if the user communicated with a user corresponding to the phone number through another communication method, such as email. Another example rule may specify to add a phone number to a blacklist if the phone number was previously identified as a source of spam telephone calls.

The model trainer 285 may use the historical data 250 to train the list management models 235 using machine learning. The models of the list management models 235 may be configured to receive the device locations 255, the telephone call data 225, and/or the user data 230 for a user and output phone numbers to add to the whitelist or blacklist for that user. Different models may be configured to receive different types of data. For example, a model may be configured to receive telephone numbers of previous phone calls, dates and times of the previous telephone calls, and a duration of the previous telephone calls. This model may be configured to output one or more phone numbers to add to a whitelist and/or one or more phone numbers to add to a blacklist. Another model may be configured to receive telephone numbers of messages, the contents of those messages, and dates and time of the previous messages. This model may be configured to output one or more phone numbers to add to a whitelist and/or one or more phone numbers to add to a blacklist. The network list generator 270 may be configured to select the appropriate model based on the data that the network list manager 118 has to provide to the model.

The model trainer 285 may generate data samples from the historical data 250. Each data sample may include data for a particular phone number at a particular point in time. The same phone number may correspond to different data samples that reflect the historical data of the phone number at different points in time. A data sample may include, for a phone number at a given point in time, the previous device locations, the previous telephone call data, the previous user data, the whitelist of the phone number, and the blacklist of that phone number. Another data sample may include, for a different phone number at the same given point in time, the previous device locations, the previous telephone call data, the previous user data, the whitelist of the different phone number, and the blacklist of the different phone number.

The data samples may include different types of data based on the data stored in the historical data 250. Some data samples may include previous phone calls, dates and times of the previous telephone calls, a duration of the previous telephone calls, and whitelists. Other data samples may include telephone numbers of messages, the contents of those messages, dates and time of the previous messages, whitelists, and blacklists. The model trainer 285 may group the data samples that include the same types of data. The model trainer 285 may train the list management models 235 using machine learning and a group of data samples that include the same types of data. The resulting model is configured to receive the type of data included in the data samples and output phone numbers to add to the whitelist or blacklist for the user associated with the input data.

The one or more processors 210 may implement a network list manager 275. The network list manager 275 may be similar to the network list manager 118 of FIG. 1. The network list manager 275 may be configured to analyze the device locations 255, the telephone call data 225, the user data 230, the network whitelists 245, and the network blacklists 247 to determine whether to merge any of the whitelists or blacklists and/or synchronize the whitelists or blacklists with any local whitelists or local blacklists stored on the computing devices of the users. The network list manager 275 may analyze the device locations 255, the telephone call data 225, the user data 230, the network whitelists 245, and the network blacklists 247 using the list management models 235 and/or the list management rules 240. The rules may specify how to compare the device locations 255, the telephone call data 225, the user data 230, the network whitelists 245, and the network blacklists 247. The comparison may identify various patterns, characteristics, and/or features of the device locations 255, the telephone call data 225, the user data 230, the network whitelists 245, and/or the network blacklists 247. Based on identifying various patterns, characteristics, and/or features, a rule may specify whether to merge or synchronize whitelists or blacklists. The models may be configured to receive device locations 255, the telephone call data 225, the user data 230, the network whitelists 245, and/or the network blacklists 247 and output data indicating which whitelists and/or blacklists should be merged and/or synchronized.

The network list manager 275 may include a list synchronization manager 280. The list synchronization manager 280 may be configured to use the list management rules 240 to analyze the device locations 255, the telephone call data 225, the user data 230, the network whitelists 245, and the network blacklists 247 to determine whether to synchronize the whitelists or blacklists with any local whitelists or local blacklists stored on the computing devices of the users. The list management rules 240 may specify conditions that may initiate the synchronization of the whitelists or blacklists with any local whitelists or local blacklists. Some of these conditions may be specified by a user and other conditions specified by an owner/operator of the network of the server 200. For example, a user may specify to synchronize the local whitelist or the local blacklist of the device of the user with the network whitelist or the network blacklist in response to detecting a change in the local whitelist or the local blacklist. The owner/operator of the network of the server 200 may specify to synchronize the local whitelist or the local blacklist of the device of the user with the network whitelist or the network blacklist on a periodic basis, such as every day, or when there is a change in the network whitelist or the network blacklist. Other rules may specify to synchronize the local whitelist or the local blacklist of the device of the user with the network whitelist or the network blacklist once the computing device is plugged in and/or connected to a Wi-Fi network.

The network list manager 275 may include a list merging manager 282. The list synchronization manager 280 may be configured to use the list management rules 240 and/or the list management models 235 to analyze the device locations 255, the telephone call data 225, the user data 230, the network whitelists 245, the network blacklists 247, and a phone number to determine whether to merge any of the whitelists or blacklists of the network whitelists 245 and network blacklists 247 with the whitelist or blacklist of the phone number. The list management rules 240 may specify what features, characteristics, and/or patterns to identify in the device locations 255, the telephone call data 225, and the user data 230. Based on the features, characteristics, and/or patterns, the list management rules 240 may specify whitelists or blacklists to merge with the whitelists or blacklists of the phone number. The list management models 235 may be configured to receive data identifying a user, phone number, or device, the device locations 255, the telephone call data 225, and the user data 230 and output one or more whitelists or blacklists to merge with the whitelist or blacklist for the phone number. The list management models 235 may be trained using machine learning and the historical data 250.

The model trainer 285 may be configured to analyze the historical data 250 to generate additional types of list management models 235. As noted above, the historical data 250 may also include previous whitelists and blacklists used during the collection of the previous device locations, the previous telephone call data, and/or the previous user data. The phone numbers in the whitelists and blacklists may also include data identifying an origin of the phone numbers. For example, a first phone number in a whitelist may have been added by the network list generator 270. A second phone number in a whitelist may have been from a merging of a whitelist for a third phone number. A fourth phone number in a whitelist may have been added by the user.

The model trainer 285 may analyze the historical data 250 to identify patterns in the historical data 250. Based on the patterns, the model trainer 285 may generate a rule that specifies what patterns or characteristics of the device locations 255, the telephone call data 225, and/or the user data 230 should correspond to merging a whitelist or blacklist for a phone number with another whitelist or blacklist for a different phone number. For example, the model trainer 285 may generate a rule that specifies that the whitelists of two phone numbers should not be merged if one of the users of the phone numbers has ignored phone calls from the other user more than two times per month. The model trainer 285 may also generate a rule that specifies that the blacklists of two phone numbers should be merged if one of the users of the phone numbers answered phone calls from the other user more than two times per week.

Some of the rules included in the list management rules 240 may be predetermined, received from a user, and/or received from an operator/owner of the network of the server 200. An example rule may specify to merge a whitelist and blacklist with the whitelists and blacklists of users included in the contact list of a user. Another example rule may specify to merge a whitelist and blacklist with the whitelists and blacklists of users that the user has communicated with using both voice and messaging methods in the past month. Another example rule may specify to merge a whitelist and blacklist if the whitelist and blacklist have at least a threshold number of phone numbers in common, such as ninety percent.

The model trainer 285 may use the historical data 250 to train the list management models 235 using machine learning. The models of the list management models 235 may be configured to receive the device locations 255 for a user, the telephone call data 225 for a user, and the user data 230 for a user and output phone number identifying other blacklists or whitelists to merge with the whitelist or blacklist of the user. Different models may be configured to receive different types of data. For example, a model may be configured to receive telephone numbers of previous phone calls, dates and times of the previous telephone calls, a duration of the previous telephone calls, and data identifying a user. This model may be configured to output the phone number identifying other blacklists or whitelists to merge with the whitelist or blacklist of the user. Another model may be configured to receive telephone numbers of messages, the contents of those messages, and dates and time of the previous messages. This model may be configured to output the phone number identifying other blacklists or whitelists to merge with the whitelist or blacklist of the user. The list merging manager 282 may be configured to select the appropriate model based on the data that the list merging manager 282 has available to provide to the model.

The model trainer 285 may generate data samples from the historical data 250. Each data sample may include data for a particular phone number at a particular point in time. The same phone number may correspond to different data samples that reflect the historical data of the phone number at different points in time. A data sample may include, for a phone number at a given point in time, the previous device locations, the previous telephone call data, the previous user data, the whitelist or blacklist of the phone number, and data identifying the origin of the phone numbers in the whitelist or blacklist. Another data sample may include, for a different phone number at the same given point in time, the previous device locations, the previous telephone call data, the previous user data, the whitelist or blacklist of the phone number, and data identifying the origin of the phone numbers in the whitelist or blacklist.

The data samples may include different types of data based on the data stored in the historical data 250. Some data samples may include previous phone calls, dates and times of the previous telephone calls, a duration of the previous telephone calls, and data identifying the origin of the phone numbers in the whitelist or blacklist. Other data samples may include telephone numbers of messages, the contents of those messages, dates and time of the previous messages, a blacklist, and data identifying the origin of the phone numbers in the blacklist. The model trainer 285 may group the data samples that include the same types of data. The model trainer 285 may train the list management models 235 using machine learning and a group of data samples that include the same types of data. The resulting model is configured to receive the type of data included in the data samples and output a phone number of another whitelist or blacklist to merge with the phone number associated with the received data.

The network list generator 270 may continue to monitor the telephone call data 225, the user data 230, and/or the device locations 255 and update the network blacklists 247 and/or network whitelists 245. The list synchronization manager 280 may continue to monitor the telephone call data 225, the user data 230, and/or the device locations 255, the network blacklists 247, and/or network whitelists 245 and determine when to synchronize the network blacklists 247 and/or network whitelists 245 with local blacklists and/or whitelists. The list merging manager 282 may continue to monitor the telephone call data 225, the user data 230, and/or the device locations 255, the network blacklists 247, and/or network whitelists 245 and determine when to merge the network blacklists 247 and/or network whitelists 245.

Figure 3:
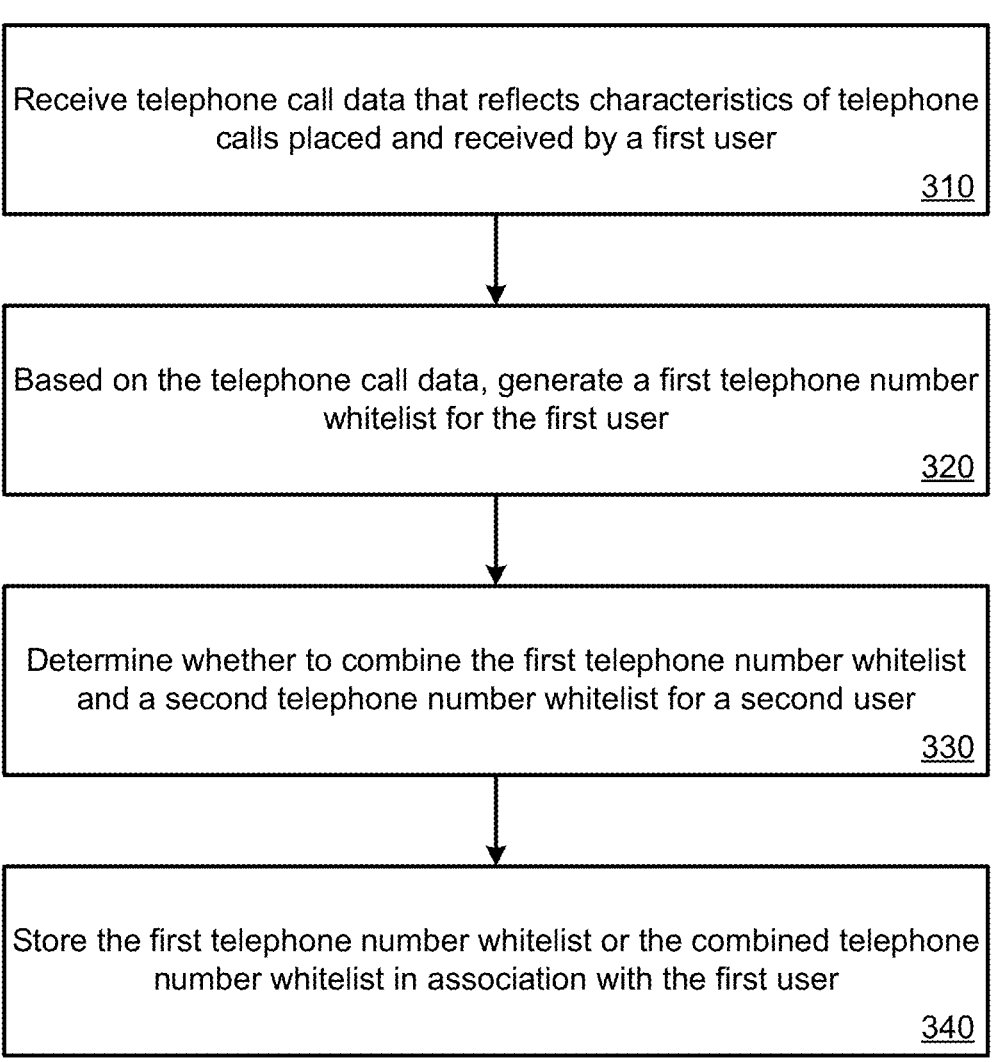
FIG. 3 is a flowchart of an example process for managing telephone number whitelists and blacklists.

FIG. 3 is a flowchart of an example process 300 for managing telephone number whitelists and blacklists. In general, the process 300 analyzes telephone call data of a user. Based on analyzing the telephone call data, the process 300 generates a whitelist for the user. The process 300 determines whether to merge the whitelist for the user with other whitelists. The process 300 stores the whitelist to compare to incoming telephone calls. The process 300 will be described as being performed by the server 134 of FIG. 1 and will include references to other components in FIG. 1. In some implementations, the process 300 may be performed by the server 200 of FIG. 2.

The server 134 receives telephone call data that reflects characteristics of telephone calls placed and received by a first user 102 (310). The telephone call data 116 may include data indicating the date, time, and/or the duration of telephone calls placed and received by the first user 102 and/or the second user 104. The telephone call data 116 may also include data indicating whether the called party answered the telephone call, whether the voicemail system answered the telephone call, and/or whether the calling party left a voicemail. The telephone call data may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

In some implementations, the server 134 may receive user data 120 of the first user 102 and the second user 104. The user data 120 may include data related to the incoming and outgoing data of the computing devices 106 and 108. The user data 120 may be related to the incoming and outgoing data of the data communication channel. The user data 120 may include a date, time, duration of the data exchanged, and/or the amount of data exchanged. The user data 120 may also include data indicating a geographic and network location of the computing device with which the computing devices 106 or 108 was communicating. The user data 120 may include data identifying an application on the computing devices 106 or 108 that interacted with the data exchanged.

In some implementations, the server 134 may receive location data that the current and previous locations of the computing devices 106 and 108. The location data may include timestamps that indicate the date and time that the computing devices 106 and 108 were at various locations and the time period that the computing devices 106 and 108.

Based on the telephone call data, the server 134 generates a first telephone number whitelist for the first user (320). In some implementations, the server 134 may generate the first telephone number whitelist based further on the user data and the location data. In some implementations, the server 134 may generate a first telephone number blacklist for the first user based on the telephone call data, the user data, and/or the location data. The server 134 may be configured to receive telephone calls for the first user. The incoming telephone calls may be from a calling phone number. The server 134 may be configured to compare the calling phone number to the first telephone number whitelist and the first telephone number blacklist. If the calling phone number matches a phone number in the first telephone number blacklist, then the server 134 may block the telephone call. If the calling phone number matches a phone number in the first telephone number whitelist, then the server 134 may permit the telephone call. If the calling phone number does not match a phone number in the first telephone number blacklist or the first telephone number blacklist, then the server 134 may perform additional processing to determine whether to block or permit the telephone call.

The server 134 determines whether to combine the first telephone number whitelist and a second telephone number whitelist for a second user (330). Combining the first telephone number whitelist and the second telephone number whitelist may be similar to merging the first telephone number whitelist and the second telephone number whitelist. This can include identifying the phone numbers that are in one list and not in the other list and adding the missing phone numbers to the list. In some implementations, the server 134 may determine a relationship between the first user and the second user. Based on this relationship, the server 134 may determine whether to combine the first telephone number whitelist and the second telephone number whitelist. For example, if the phone number of the first user is in the address book of the second user or the phone number of the second user is in the address book of the first user, then the server 134 may determine to combine the first telephone number whitelist and a second telephone number whitelist for a second user. As another example, if the first user has communicated through, for example, text or voice communications, with the second user at least a threshold number of times within a period of time, then the server 134 may determine to combine the first telephone number whitelist and a second telephone number whitelist for a second user. As another example, if the first user and the second user live in the same household or are on the same wireless carrier account, then the server 134 may determine to combine the first telephone number whitelist and a second telephone number whitelist for a second user.

In some implementations, the server 134 may determine whether to combine the first telephone number whitelist and the second telephone number whitelist and/or combine the first telephone number blacklist and the second telephone number blacklist based on the telephone call data. The server 134 may determine to combine blacklists for any of the same reasons as combining whitelists. The telephone call data may indicate communications between the first user and the second user. These communications may indicate that the whitelists and/or blacklists may be combined.

In some implementations, the server 134 may compare the first telephone number whitelist with the second telephone number whitelist. Based on this comparison, the server 134 may determine to combine the first telephone number whitelist and the second telephone number whitelist. Similarly, and in some implementations, the server 134 may compare the first telephone number blacklist with the second telephone number blacklist. Based on this comparison, the server 134 may determine to combine the first telephone number blacklist and the second telephone number blacklist. For example, if the whitelists and/or blacklists share a threshold number of phone numbers such as eighty percent or fifty phone numbers, then the server 134 may determine to combine the whitelists and/or blacklists. In some implementations, the server 134 may automatically determine to combine a whitelist or blacklist based on determining to combine the other of the whitelist or blacklist.

The server 134 stores the first telephone number whitelist or the combined telephone number whitelist in association with the first user (340). In instances where the server 134 determines to combine the first telephone number whitelist and the second telephone number whitelist, the server 134 may store the combined telephone number whitelist in association with a phone number of the first user. In instances where the server 134 determines to combine the first telephone number blacklist and the second telephone number blacklist, the server 134 may store the combined telephone number blacklist in association with the phone number of the first user. In instances where the server 134 determines to bypass combining the first telephone number blacklist and the second telephone number blacklist, the server 134 may store the first telephone number blacklist and the second telephone number blacklist in association with the phone number of the first user and the phone number of the second user, respectively. In instances where the server 134 determines to bypass combining the first telephone number whitelist and the second telephone number whitelist, the server 134 may store the first telephone number whitelist and the second telephone number whitelist in association with the phone number of the first user and the phone number of the second user, respectively.

The server 134 may store the first telephone number whitelist and/or blacklist or the combined telephone number whitelist and/or blacklist in a network accessible location. The location may be on the server 134 or on another computing device accessible by the server 134. In some implementations, the server 134 may synchronize the first telephone number whitelist and/or blacklist or the combined telephone number whitelist and/or blacklist with a whitelist and/or blacklist that is stored locally on the computing device of the first user.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
 accessing, by a server, a first telephone number whitelist that is associated with a telephone number, that includes a first telephone number and a second telephone number, and that is locally stored on a computing device that is associated with the telephone number;
 accessing, by the server, a second telephone number whitelist that is associated with the telephone number, that includes the first telephone number and a third telephone number, and that is locally stored on the server and remotely stored from the computing device that is associated with the phone number;

determining, by the server, first characteristics of the first telephone number whitelist and second characteristics of the second telephone number whitelist;

determining, by the server, characteristics of previous incoming telephone calls to the computing device that is associated with the telephone number and previous outgoing telephone calls from the computing device that is associated with the telephone number; and based on the first characteristics of the first telephone number whitelist and the second characteristics of the second telephone number whitelist and based on the characteristics of the previous incoming telephone calls to the computing device that is associated with the telephone number and the previous outgoing telephone calls from the computing device that is associated with the telephone number, synchronizing, by the server, the first telephone number whitelist and the second telephone number whitelist by adding the third telephone number to the first telephone number whitelist and adding the second telephone number to the second telephone whitelist.

2. The method of claim 1, comprising:
receiving, by the server and from the computing device that is associated with the telephone number, data indicating whether to synchronize the first telephone number whitelist and the second telephone number whitelist, wherein synchronizing the first telephone number whitelist and the second telephone number whitelist is further based on the data indicating whether to synchronize the first telephone number whitelist and the second telephone number whitelist.

3. The method of claim 1, comprising:
determining, by the server, an amount of time that has elapsed since a previous synchronization of the first telephone number whitelist and the second telephone number whitelist, wherein synchronizing the first telephone number whitelist and the second telephone number whitelist is further based on the amount of time that has elapsed since the previous synchronization of the first telephone number whitelist and the second telephone number whitelist.

4. The method of claim 1, wherein determining the first characteristics of the first telephone number whitelist comprises:
determining that the first telephone number whitelist has merged with a third telephone number whitelist associated with an additional telephone number.

5. The method of claim 1, wherein determining the second characteristics of the second telephone number whitelist comprises:
determining that the second telephone number whitelist has merged with a third telephone number whitelist associated with an additional telephone number.

6. The method of claim 1, comprising:
after synchronizing the first telephone number whitelist and the second telephone number whitelist, generating, by the server, a merged telephone number whitelist by merging the first telephone number whitelist and the second telephone number whitelist;

replacing, by the server, the first telephone number whitelist with the merged telephone number whitelist; and replacing, by the server, the second telephone number whitelist with the merged telephone number whitelist.

7. The method of claim 1, wherein the characteristics of the previous incoming telephone calls to the computing device that is associated with the telephone number and the previous outgoing telephone calls from the computing device that is associated with the telephone number comprises one or more of:

data identifying a called party and a calling party;
data indicating a time period that the telephone number has been assigned to the computing device associated with the telephone number;
data indicating a time period that the telephone number was unassigned before being assigned to the computing device associated with the telephone number;
data indicating a location of the calling party;
data indicating the date, time, and the duration of the telephone calls;
data indicating whether the called party answered the telephone calls;
data indicating whether a voicemail system answered the telephone calls; or
data indicating whether the calling party left a voicemail.

8. The method of claim 1, wherein:
the first characteristics of the first telephone number whitelist comprise first telephone numbers included in the first telephone number whitelist, and
the second characteristics of the second telephone number whitelist comprise second telephone numbers included in the second telephone number whitelist.

9. The method of claim 1, comprising:
after synchronizing the first telephone number whitelist and the second telephone number whitelist, bypassing generating, by the server, a merged telephone number whitelist by merging the first telephone number whitelist and the second telephone number whitelist.

10. A system, comprising:
one or more processors; and
memory including a plurality of computer-executable components that are executable by the one or more processors to perform a plurality of acts, the plurality of acts comprising:
accessing a first telephone number whitelist that is associated with a telephone number, that includes a first telephone number and a second telephone number, and that is locally stored on a computing device that is associated with the telephone number;
accessing a second telephone number whitelist that is associated with the telephone number, that includes the first telephone number and a third telephone number, and that is locally stored on the system and remotely stored from the computing device that is associated with the phone number;
determining first characteristics of the first telephone number whitelist and second characteristics of the second telephone number whitelist;
determining, by the server, characteristics of previous incoming telephone calls to the computing device that is associated with the telephone number and previous outgoing telephone calls from the computing device that is associated with the telephone number; and
based on the first characteristics of the first telephone number whitelist and the second characteristics of the second telephone number whitelist and based on the characteristics of the previous incoming telephone calls to the computing device that is associated with the telephone number and the previous outgoing telephone calls from the computing device that is associated with the telephone number, synchronizing the first telephone number whitelist and the second telephone number whitelist by adding the third telephone number to the first telephone number whitelist and adding the second telephone number to the second telephone whitelist.

11. The system of claim 10, wherein the plurality of acts comprise:
receiving, by the server and from the computing device that is associated with the telephone number, data indicating whether to synchronize the first telephone number whitelist and the second telephone number whitelist,
wherein synchronizing the first telephone number whitelist and the second telephone number whitelist is further based on the data indicating whether to synchronize the first telephone number whitelist and the second telephone number whitelist.

12. The system of claim 10, wherein the plurality of acts comprise:
determining an amount of time that has elapsed since a previous synchronization of the first telephone number whitelist and the second telephone number whitelist,
wherein synchronizing the first telephone number whitelist and the second telephone number whitelist is further based on the amount of time that has elapsed since the previous synchronization of the first telephone number whitelist and the second telephone number whitelist.

13. The system of claim 10, wherein determining the first characteristics of the first telephone number whitelist comprises:
determining that the first telephone number whitelist has merged with a third telephone number whitelist associated with an additional telephone number.

14. The system of claim 10, wherein determining the second characteristics of the second telephone number whitelist comprises:
determining that the second telephone number whitelist has merged with a third telephone number whitelist associated with an additional telephone number.

15. The system of claim 10, wherein the plurality of acts comprise:
after synchronizing the first telephone number whitelist and the second telephone number whitelist, generating, by the server, a merged telephone number whitelist by merging the first telephone number whitelist and the second telephone number whitelist;
replacing the first telephone number whitelist with the merged telephone number whitelist; and
replacing the second telephone number whitelist with the merged telephone number whitelist.

16. The system of claim 10, wherein:
the first characteristics of the first telephone number whitelist comprise first telephone numbers included in the first telephone number whitelist, and
the second characteristics of the second telephone number whitelist comprise second telephone numbers included in the second telephone number whitelist.

17. The system of claim 10, wherein the plurality of acts comprise:
after synchronizing the first telephone number whitelist and the second telephone number whitelist, bypassing generating, by the server, a merged telephone number whitelist by merging the first telephone number whitelist and the second telephone number whitelist.

18. A computer-implemented method, comprising:
receiving, by a server and from a computing device that is associated with a telephone number, first telephone numbers that are included in a first telephone number blacklist that is stored locally on the computing device that is associated with the telephone number and that identifies the first telephone numbers that are blocked from ringing the computing device that is associated with the telephone number after placing a first call to the computing device that is associated with the telephone number, wherein the first telephone numbers include a first telephone number and a second telephone number;
accessing, by the server, the first telephone number and a third telephone number that are included in a second telephone number blacklist that is stored locally on the server and that identifies the second telephone numbers that are blocked from ringing the computing device that is associated with the telephone number after placing a second call to the computing device that is associated with the telephone number, wherein the second telephone numbers include the first telephone number and a third telephone number;
determining, by the server, characteristics of previous incoming telephone calls to the computing device that is associated with the telephone number and previous outgoing telephone calls from the computing device that is associated with the telephone number;
determining, by the server, data communication channel data that indicates characteristics of data transmitted and received by the computing device that is associated with the telephone number over a data communication channel; and
based on the characteristics of the previous incoming telephone calls to the computing device that is associated with the telephone number and the previous outgoing telephone calls from the computing device that is associated with the telephone number and the data communication channel data, synchronizing, by the server, the first telephone number blacklist and the second telephone number blacklist by adding the third telephone number to the first telephone number blacklist and adding the second telephone number to the second telephone blacklist.

19. The system of claim 10, wherein the characteristics of the incoming telephone calls to the computing device that is associated with the telephone number and outgoing telephone calls from the computing device that is associated with the telephone number comprise:
data identifying a called party and a calling party;
data indicating a time period that the telephone number has been assigned to the computing device associated with the telephone number;
data indicating a time period that the telephone number was unassigned before being assigned to the computing device associated with the telephone number;
data indicating a location of the calling party;
data indicating the date, time, and the duration of the telephone calls;
data indicating whether the called party answered the telephone calls;

data indicating whether a voicemail system answered the telephone calls; and
data indicating whether the calling party left a voicemail.

\* \* \* \* \*